(12) United States Patent
Franklin

(10) Patent No.: US 11,110,867 B2
(45) Date of Patent: Sep. 7, 2021

(54) GUN RACK

(71) Applicant: Joanna Claire Franklin, Rayville, LA (US)

(72) Inventor: Joanna Claire Franklin, Rayville, LA (US)

(*) Notice: Subject to any disclaimer, the term of this patent is extended or adjusted under 35 U.S.C. 154(b) by 0 days.

(21) Appl. No.: 16/599,651

(22) Filed: Oct. 11, 2019

(65) Prior Publication Data

US 2021/0107410 A1  Apr. 15, 2021

(51) Int. Cl.
*A47F 7/00* (2006.01)
*A47B 81/00* (2006.01)
*B60R 7/14* (2006.01)

(52) U.S. Cl.
CPC .............. *B60R 7/14* (2013.01); *A47B 81/005* (2013.01); *A47F 7/0021* (2013.01)

(58) Field of Classification Search
CPC ........ B60R 7/14; A47B 81/00; A47B 81/005; A47F 7/0021; A47F 7/0028; A47F 7/0035; A47F 5/08; F41A 23/18
USPC ...... 211/64, 60.1, 175; 42/94; 224/275, 552, 224/913
See application file for complete search history.

(56) References Cited

U.S. PATENT DOCUMENTS

| | | | | | |
|---|---|---|---|---|---|
| 1,914,259 A | * | 6/1933 | Laten | ....................... | B60R 7/14 224/311 |
| 2,158,623 A | * | 5/1939 | Fischbacher | ......... | A47B 81/005 312/6 |
| 2,593,402 A | * | 4/1952 | Aitchison | ............ | A47B 81/005 211/64 |
| 2,783,896 A | * | 3/1957 | Agostini | ................... | B60R 7/14 211/64 |
| 2,919,058 A | * | 12/1959 | Thompson | ................ | B60R 7/14 224/546 |
| 3,497,077 A | * | 2/1970 | Sjostrand | .................. | B60R 7/14 211/64 |
| 3,556,363 A | * | 1/1971 | Whittaker | ................. | B60R 7/14 224/546 |
| 3,746,177 A | * | 7/1973 | Vilotti | ..................... | F41A 23/18 211/64 |
| 3,876,078 A | * | 4/1975 | Gomes | ................. | A47B 81/005 211/64 |
| 3,910,382 A | * | 10/1975 | Justice | .................... | F41A 23/18 187/401 |
| 3,917,071 A | * | 11/1975 | Walters | .................... | E05B 73/00 211/64 |
| 3,952,878 A | * | 4/1976 | Gorham | .................. | F41A 23/18 211/64 |
| 4,132,315 A | * | 1/1979 | Young | ..................... | E05B 73/00 211/4 |
| 4,144,971 A | * | 3/1979 | Balibrea | ................. | F41A 23/18 211/64 |
| 4,174,042 A | * | 11/1979 | Fair | ......................... | E05B 73/00 211/64 |

(Continued)

*Primary Examiner* — Jennifer E. Novosad

(57) ABSTRACT

A gun rack includes a gun butt support having upstanding sidewalls vertically extending and sized to receive a butt of a gun therebetween. An elongated rod is coupled to the gun butt support and extends vertically therefrom. A barrel support bracket includes a bracket base and extensions horizontally extending from the bracket base forming a U-shaped receptacle sized to receive a barrel of the gun. The barrel support bracket is coupled to a top end of the elongated rod.

1 Claim, 5 Drawing Sheets

(56) References Cited

U.S. PATENT DOCUMENTS

| | | | | |
|---|---|---|---|---|
| 4,696,461 A | * | 9/1987 | Zelinski | B25B 11/00 211/64 |
| 4,720,016 A | * | 1/1988 | Kay | A47B 61/003 211/103 |
| 4,936,531 A | * | 6/1990 | Bauser | B60N 3/00 211/64 |
| 5,078,309 A | * | 1/1992 | Hull | B60R 7/14 211/64 |
| 5,443,191 A | * | 8/1995 | Jorgenson | B60R 7/14 224/543 |
| 5,454,931 A | * | 10/1995 | Lauve, Jr. | F41A 23/18 206/317 |
| 5,495,969 A | * | 3/1996 | Cardenas | B60R 7/14 224/275 |
| 5,595,333 A | * | 1/1997 | Boston | B60R 7/14 211/60.1 |
| 5,626,379 A | * | 5/1997 | Scott | A47B 81/005 211/195 |
| 5,680,939 A | * | 10/1997 | Oliver | A47B 81/005 211/64 |
| 5,791,499 A | * | 8/1998 | Zebbedies | B60R 7/14 211/64 |
| 5,819,462 A | * | 10/1998 | Dockery | A47B 81/005 42/94 |
| 5,979,846 A | * | 11/1999 | Fluhr | B60R 7/14 211/64 |
| 6,129,252 A | * | 10/2000 | Jackson | B60R 7/14 114/351 |
| 6,206,261 B1 | * | 3/2001 | McCrary | B60R 7/14 206/315.11 |
| 6,438,885 B1 | * | 8/2002 | Murray | F41A 17/54 211/64 |
| 6,935,065 B1 | * | 8/2005 | Oliver | F41A 23/04 211/64 |
| 6,986,446 B2 | * | 1/2006 | Murray | B60R 7/14 211/64 |
| 7,137,511 B1 | * | 11/2006 | Crowell | F41A 23/18 211/4 |
| D611,558 S | * | 3/2010 | Freeman | D22/108 |
| 7,770,740 B2 | * | 8/2010 | Punzel | B60R 7/14 211/64 |
| 8,403,278 B1 | * | 3/2013 | Kasbohm | F41A 23/18 248/206.5 |
| 8,678,206 B2 | * | 3/2014 | Kubiniec | A47B 81/005 211/64 |
| 8,910,560 B2 | * | 12/2014 | Irwin | B60R 7/14 89/37.01 |
| 8,950,596 B2 | * | 2/2015 | Arabian | A47B 81/005 211/64 |
| 9,884,593 B2 | * | 2/2018 | Hull | A47B 96/1475 |
| 10,144,358 B2 | * | 12/2018 | Fife | B60R 7/043 |
| 10,810,846 B1 | * | 10/2020 | Gonzalez | A47B 81/005 |
| 2004/0164036 A1 | * | 8/2004 | Cummins | A47B 49/00 211/64 |
| 2008/0252414 A1 | * | 10/2008 | Crigger | G07C 9/253 340/5.52 |
| 2011/0168649 A1 | * | 7/2011 | Stolz | A47B 81/005 211/4 |
| 2011/0198375 A1 | * | 8/2011 | Bennett | B60R 7/14 224/401 |
| 2014/0097222 A1 | * | 4/2014 | Robinson | B60R 7/14 224/401 |
| 2014/0312087 A1 | * | 10/2014 | Malingen | B60R 7/14 224/539 |
| 2015/0069103 A1 | * | 3/2015 | Fife | B60R 7/14 224/555 |
| 2015/0128668 A1 | * | 5/2015 | Meredith | G07C 9/00563 70/266 |
| 2015/0182020 A1 | * | 7/2015 | Rahman | B60R 7/14 211/64 |
| 2015/0272324 A1 | * | 10/2015 | Self | F41A 23/18 211/64 |
| 2015/0362280 A1 | * | 12/2015 | Dale | F41A 35/02 42/96 |
| 2016/0076847 A1 | * | 3/2016 | Franklin | F41A 23/18 42/94 |
| 2017/0030114 A1 | * | 2/2017 | Fisher | E05B 73/00 |
| 2017/0115087 A1 | * | 4/2017 | Di Carlo | B60R 7/046 |
| 2017/0332783 A1 | * | 11/2017 | Setina | A47B 81/005 |
| 2017/0361777 A1 | * | 12/2017 | Bornais | B60R 7/14 |
| 2018/0170268 A1 | * | 6/2018 | Fisher | B60R 7/14 |
| 2021/0107410 A1 | * | 4/2021 | Franklin | B60R 7/14 |

* cited by examiner

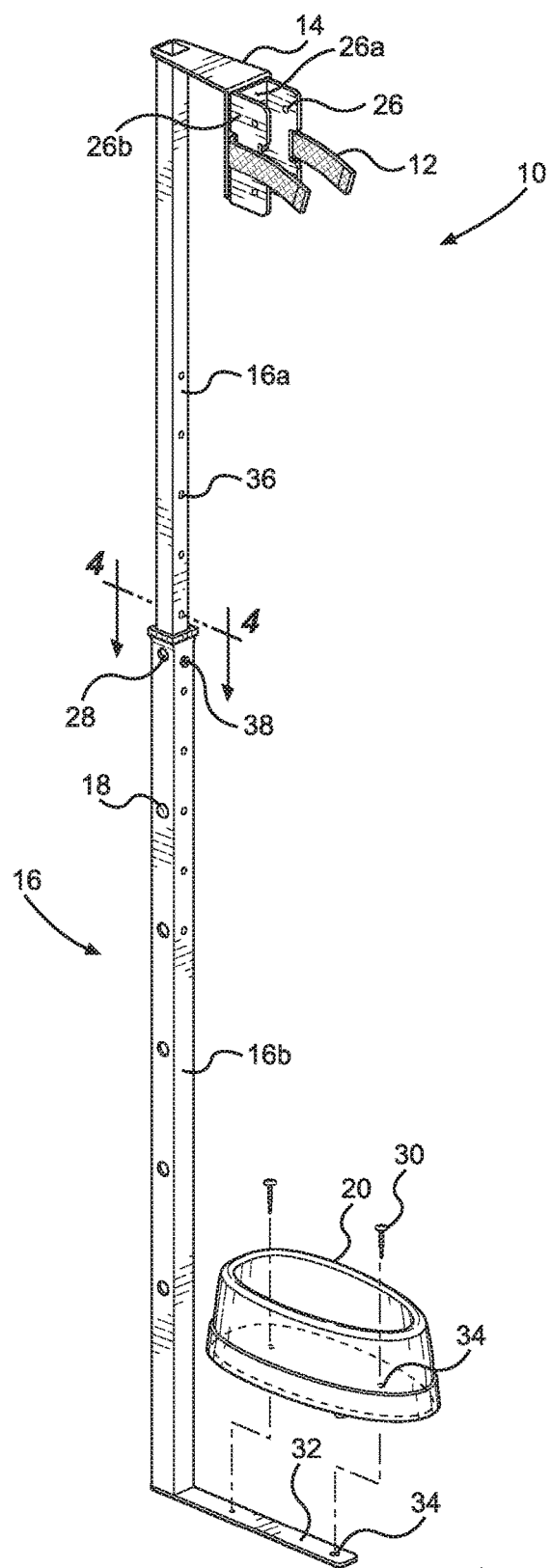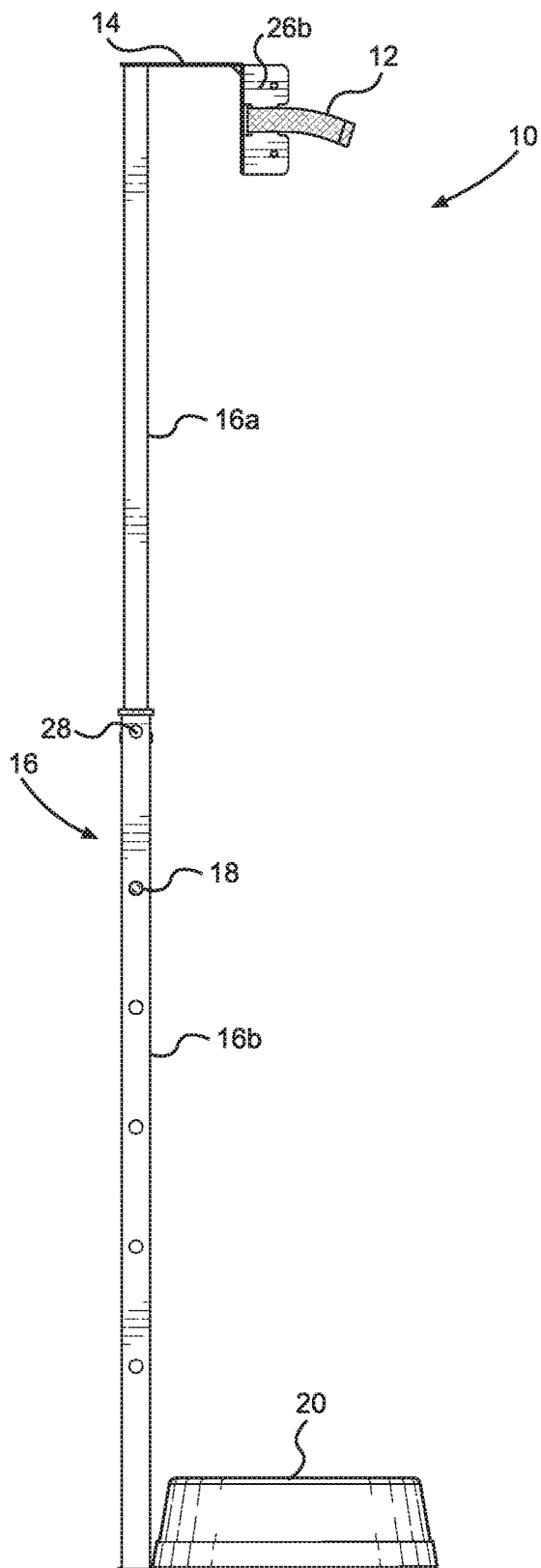
FIG. 1
FIG. 2

GUN RACK

BACKGROUND OF THE INVENTION

The present invention relates to safely securing a gun to an off-road vehicle and, more particularly, to an improved gun rack that may be easily installed on off-road vehicles.

Hunters and ranchers commonly transport guns on off road vehicles. The guns are typically laid down and not strapped or secured to the vehicle. When traveling off road, the ride is typically bumpy. With the gun lying down and unsecured, a loaded gun may accidentally discharge, causing damage to the vehicle, injury, or death.

As can be seen, there is a need for an improved gun rack that may be easily installed on off-road vehicles.

SUMMARY OF THE INVENTION

In one aspect of the present invention, a gun rack comprises: a gun butt support comprising upstanding sidewalls vertically extending and sized to receive a butt of a gun therebetween; an elongated rod coupled to the butt support and extending vertically therefrom; and a barrel support bracket coupled to the elongated rod and comprising a bracket base and extensions horizontally extending from the bracket base forming a U-shaped receptacle sized to receive a barrel of the gun.

These and other features, aspects and advantages of the present invention will become better understood with reference to the following drawings, description and claims.

BRIEF DESCRIPTION OF THE DRAWINGS

FIG. 1 is an exploded perspective view of an embodiment of the present invention;

FIG. 2 is a side view of an embodiment of the present invention;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a universal magnetic or nonmagnetic gun rack used on ATV's, UTV's, Golf Carts, Duck Blinds, Deer Blinds and Home use. The present invention is adjustable for different sized guns. The present invention includes a boot at the bottom for the gun butt of shot guns and rifles to stand in and secure the bottom of the gun. The present invention may further include hook and loop straps and magnets at the top of the gun rack to so secure the barrel. The gun rack is attached standing vertical and can adjust to fit all rifles and shotguns.

Figure 3:
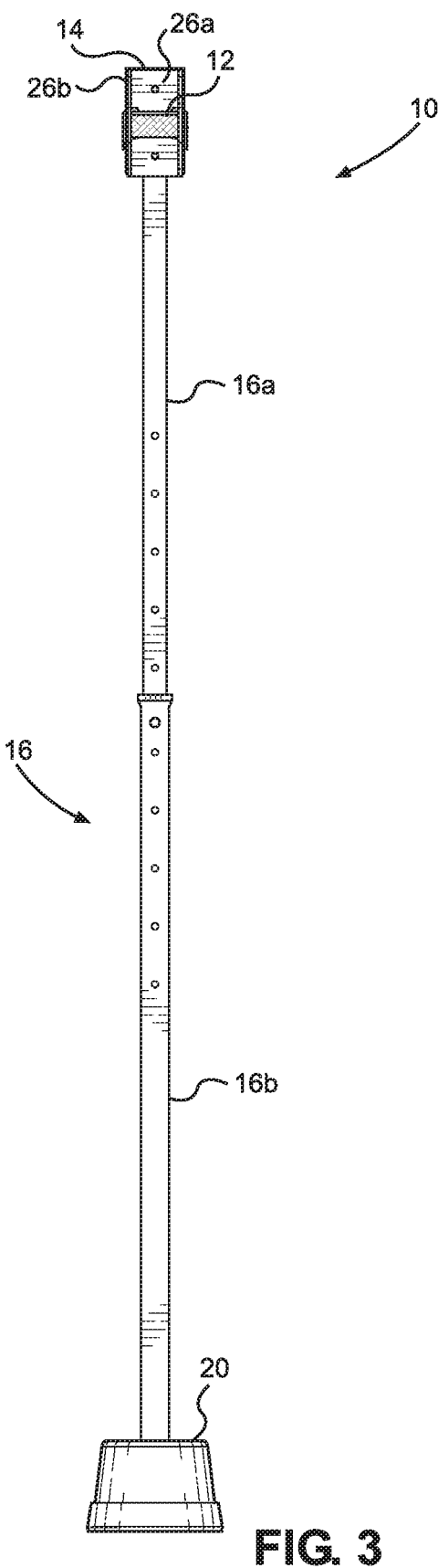
FIG. 3 is a front view of an embodiment of the present invention.
Figure 4:
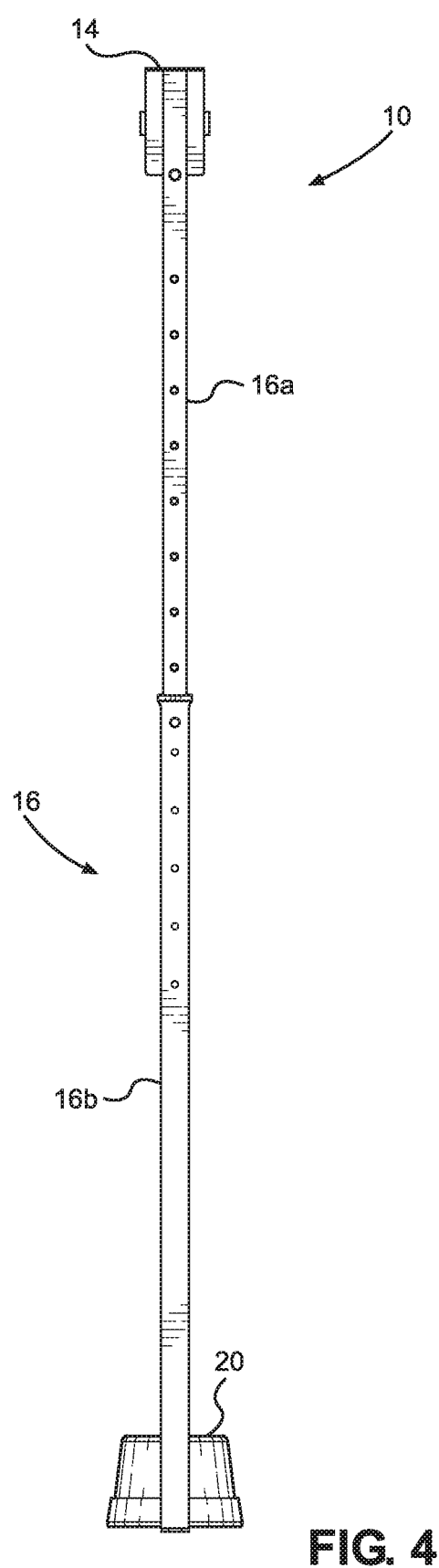
FIG. 4 is a rear view of an embodiment of the present invention.
Figure 5:
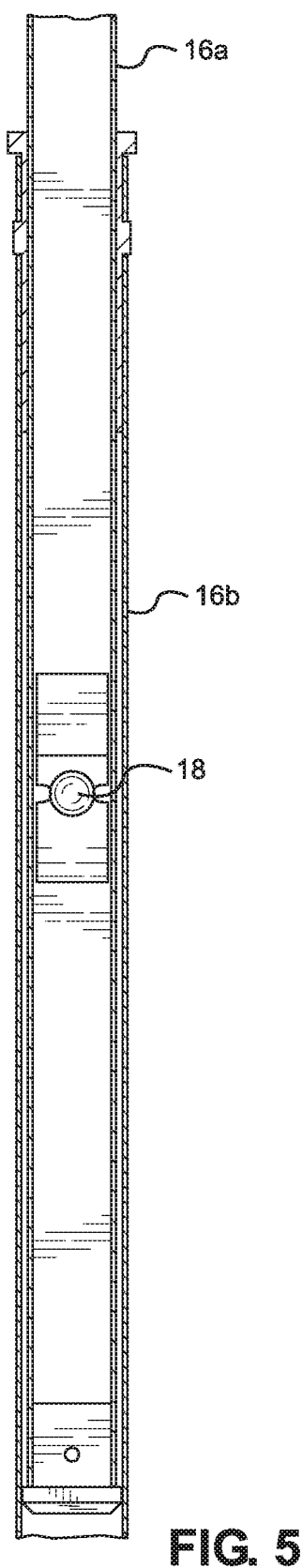
FIG. 5 is a cross sectional view of an embodiment of the present invention.
Figure 6:
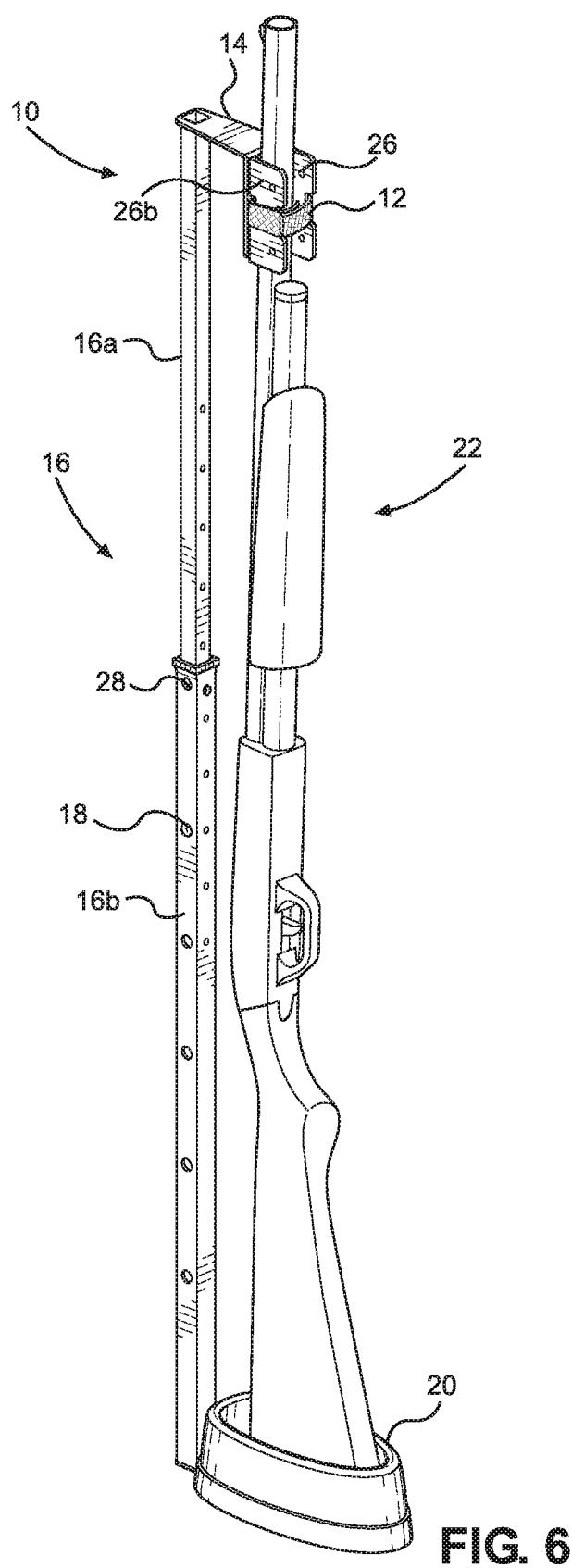
FIG. 6 is a perspective view of an embodiment of the present invention.
Figure 7:
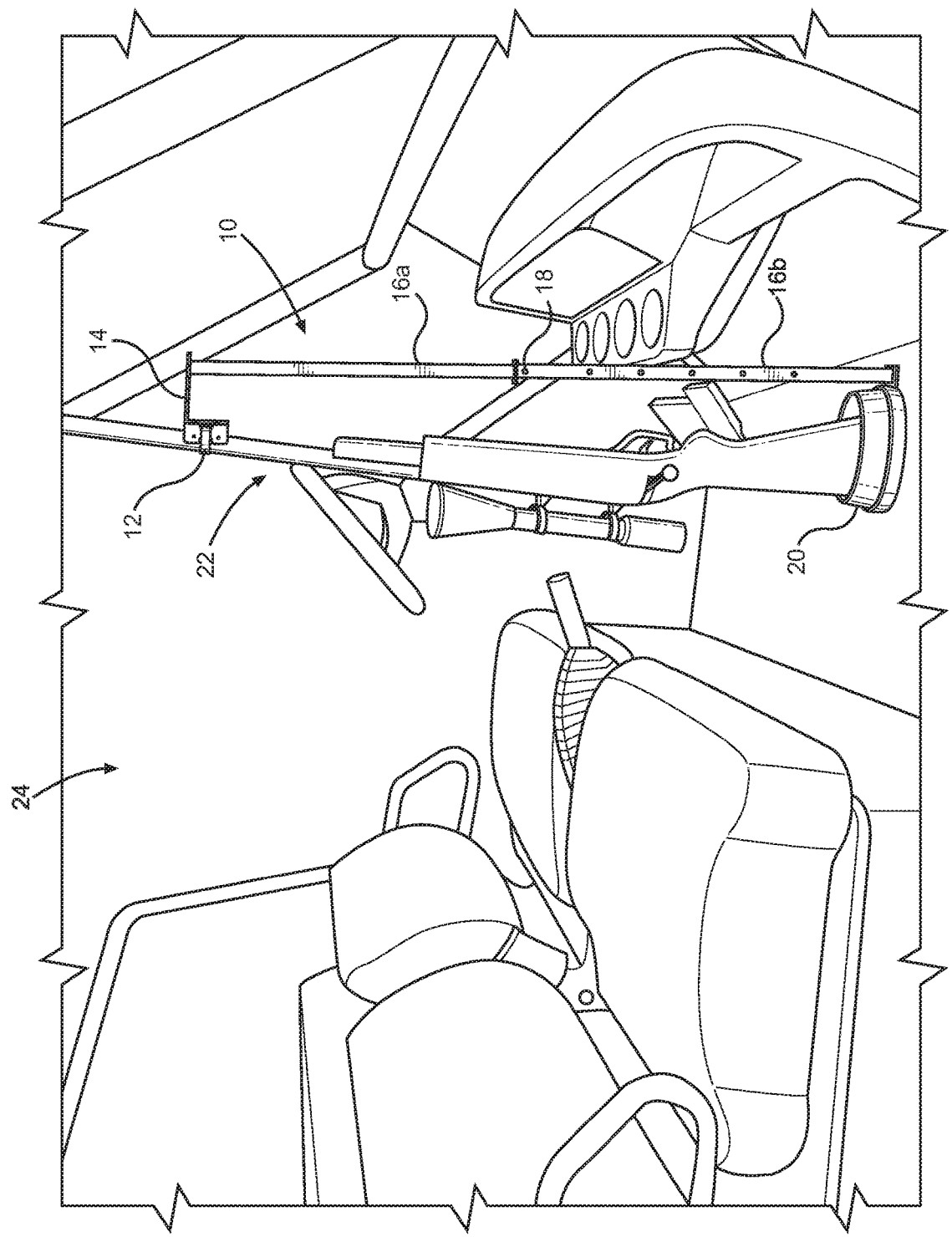
FIG. 7 is a perspective view of an embodiment of the present invention, shown in use.
Figure 8:
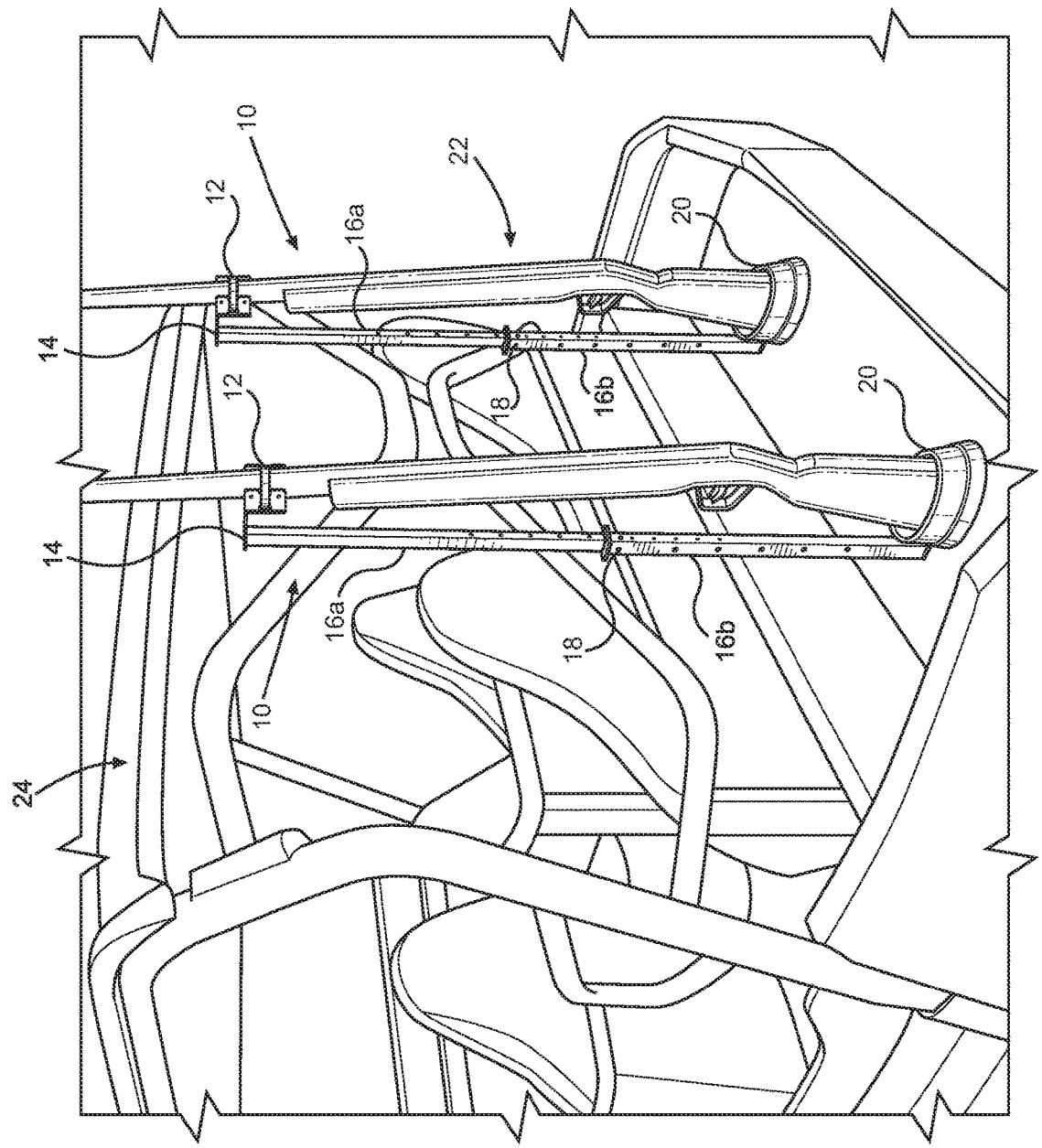
FIG. 8 is a perspective view of an embodiment of the present invention, shown in use.

Referring to FIGS. 1 through 8, the present invention includes a gun rack 10. The gun rack 10 includes a gun butt support 20 having upstanding sidewalls vertically extending and sized to receive a butt of a gun 22 therebetween. An elongated rod 16 is coupled to the gun butt support 20 and extends vertically therefrom. A barrel support bracket 26 includes a bracket base 26a and extensions 26b horizontally extending from the bracket base 26a forming a U-shaped receptacle sized to receive a barrel of the gun 22. The barrel support bracket 26 is coupled to a top end of the elongated rod 16.

The gun butt support 20 is coupled to a surface of the off-road vehicle 24 by a coupler 30. The elongated rod 16 may further include a base 32 horizontally extending from a bottom end of the elongated rod 16. Both the gun butt support 20 and the base 32 may include aligned openings 34. The coupler 30 may include fasteners running through the aligned openings 34 of the base 32 and the gun butt support 20 and into the surface of the off-road vehicle 24. The coupler 30 may also include adhesives, clips, latches, and other connecting mechanisms to couple the gun rack 10 to the off-road vehicle.

The gun butt support 20 of the present invention is utilized to properly secure the butt of the gun 22 and prevent the gun 22 from dislodging from the gun rack 10 when driving off-road. For example, the gun butt support 20 may include oval shaped upstanding sidewalls, having an inner surface defining the oval shape. The oval shape may snuggly fit the butt of the gun 22 within, preventing the butt of the gun 22 from moving, even when riding over rough terrain.

Similarly, the barrel support bracket 26 securely fastens the barrel of the gun 22. In certain embodiments, an extension bracket 14 couples the barrel support bracket 26 to the top end of the elongated rod 16 and spaces the barrel support bracket 26 away from the elongated rod 16. This allows the gun 22 to be in an upright position, as opposed to an angled position. Further, the barrel support bracket 26 may include a magnetic material, which magnetically attracts to the barrel. For additional securement of the barrel, the present invention may further include hook and loop fastener straps 12 coupled to the extensions 26b. A barrel may be placed in between the extensions 26b and the straps 12 may be secured together to prevent the barrel from escaping the extensions 26b.

In certain embodiments, the elongated rod 16 may be adjustable in length so that the gun rack 10 may be adjusted to different sized guns. For example, the elongated rod 16 may include an inner tube 16a that slidably engages with an outer tube 16b. The outer tube 16b may include openings 28 disposed along the length. A spring button 18 is secured to the inner tube 16a and spring biases within the openings 28 of the outer tube. The spring button 18 may be depressed by pushing inwards and out of the opening 28 of the outer tube. The user may then slide the inner tube 16a and outer tube 16b relative to one another in order to position the inner tube 16a and outer tube 16b to an appropriate length to secure a gun 22. The spring button 18 may then be released into the opening 28 of the outer tube 16b, securing the gun rack 10 to the appropriate length. The gun butt is then placed into the gun butt support 20 and the barrel is placed within the barrel support bracket 26. The strap 26 is then secured around the barrel, properly and safely securing the gun 22 to the gun rack 10.

In certain embodiments, the elongated rod 16 is secured to the off-road vehicle 24. For example, the inner tube 16a may include a plurality of aligned mount openings on a front and rear surface and the outer tube may include a plurality of aligned mount openings on a front and rear surface. At each level in which the spring button 18 is disposed within an opening 28, the mount openings of the inner tube 16a align with the mount openings of the outer tube 16b. Therefore, a user may first set the length of the elongated rod 16 to properly secure a gun. Then the user may insert a bolt through the aligned mount openings of the inner tube 16a and the outer tube 16b and drive the bolt into the off-road vehicle 24, thereby safely securing the gun rack 10.

It should be understood, of course, that the foregoing relates to exemplary embodiments of the invention and that modifications may be made without departing from the spirit and scope of the invention as set forth in the following claims.

What is claimed is:

1. A rack for supporting a gun, the rack consisting essentially of:
   a gun butt support including a bottom surface and upstanding sidewalls vertically extending therefrom and including an inner surface defining an oval shape which is sized to receive a butt of the gun therebetween;
   an elongated telescopic rod including an inner tube inserted into an outer tube, wherein the inner tube comprises a spring button and the outer tube comprises a plurality of openings, such that the inner tube can be adjusted with respect to the outer tube to obtain a desired length defining a first position wherein the spring button is inserted into one the plurality of openings,
   the elongated telescopic rod further comprising a plurality of mount openings on a front and rear surface of each of the inner and outer tubes, wherein the mount openings of the inner tube align with the mount openings of the outer tube when in the first position such that a bolt is adapted to be placed in the aligned mount openings, and the bolt is adapted to extend into a first surface of a vehicle,
   a bottom end of the outer tube comprises a base horizontally extending therefrom which is coupled to the bottom surface of the gun butt support and the elongated telescopic rod extending vertically from the gun butt support;
   at least one coupler extending through at least one opening in the bottom surface of the gun butt support and at least one opening in the base which is aligned with the at least one opening of the gun butt support, whereby the at least one coupler is configured to extend into a second surface of the vehicle;
   a barrel support bracket coupled to a top end of the inner tube of the elongated telescopic rod by a horizontally extending extension bracket so that the barrel support bracket is spaced away from the elongated telescopic rod thereby allowing the gun to be supported in an upright position, whereby the barrel support bracket comprises a bracket base coupled to the extension bracket and a pair of extensions horizontally extending from the bracket base forming a U-shaped receptacle therebetween sized to receive a barrel of the gun, the barrel support bracket comprising a magnetic material for magnetic attraction to the barrel of a gun;
   a pair of straps coupled to the pair of extensions of the barrel support bracket which can be secured together to retain the barrel of the gun therein.

* * * * *